United States Patent
Bates et al.

(10) Patent No.: US 10,089,725 B2
(45) Date of Patent: Oct. 2, 2018

(54) ELECTRONIC DISPLAY STABILIZATION AT A GRAPHICS PROCESSING UNIT

(71) Applicant: Google Inc., Mountain View, CA (US)

(72) Inventors: John Paul Bates, Redwood City, CA (US); Evangelos Kokkevis, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 205 days.

(21) Appl. No.: 15/018,941

(22) Filed: Feb. 9, 2016

(65) Prior Publication Data

US 2017/0228855 A1 Aug. 10, 2017

(51) Int. Cl.
| G06T 5/00 | (2006.01) |
| G06T 3/00 | (2006.01) |
| G06T 1/20 | (2006.01) |
| G06T 19/00 | (2011.01) |
| G02B 27/01 | (2006.01) |
| H04N 13/04 | (2006.01) |
| H04N 13/344 | (2018.01) |

(52) U.S. Cl.
CPC .......... *G06T 5/006* (2013.01); *G02B 27/0172* (2013.01); *G06T 1/20* (2013.01); *G06T 3/0093* (2013.01); *G06T 19/006* (2013.01); *H04N 13/044* (2013.01); *H04N 13/344* (2018.05); *G02B 27/017* (2013.01)

(58) Field of Classification Search
CPC ...... G02B 27/01; G02B 27/017; G06T 19/00; G06T 3/0093; G06T 5/006; H04N 13/0429; H04N 13/044
See application file for complete search history.

(56) References Cited

U.S. PATENT DOCUMENTS

| 8,594,381 | B2 | 11/2013 | Fedorovskaya et al. |
| 8,692,845 | B2 | 4/2014 | Fedorovskaya et al. |
| 2011/0221896 | A1 | 9/2011 | Haddick et al. |
| 2012/0306725 | A1 | 12/2012 | Hilkes |
| 2015/0310665 | A1 | 10/2015 | Michail et al. |
| 2016/0282619 | A1 | 9/2016 | Oto et al. |

(Continued)

OTHER PUBLICATIONS

U.S. Appl. No. 62/256,502 of PGPub 2017/0155885.*

(Continued)

*Primary Examiner* — Michelle L Sams

(57) ABSTRACT

An application executed at a central processing unit (CPU) of a head mounted display (HMD) system generates sets of frame drawing commands for a graphics processing unit (GPU), and for each set of frame drawing commands the GPU renders a corresponding frame into one of a plurality of frame buffers. Each frame is generated to include or be associated with a frame number that indicates the location of the frame in the sequence of frames generated over time. In addition, each frame is generated to include or be associated with pose information indicating the pose of the HMD system when the frame is generated. At periodic preemption points, the GPU selects the frame stored at the plurality of frame buffers having the most recent frame number and applies an electronic display stabilization warp to the frame based on the difference between the current pose and the pose information stored with the selected frame.

18 Claims, 5 Drawing Sheets

(56) References Cited

U.S. PATENT DOCUMENTS

2016/0364904 A1 12/2016 Parker et al.
2017/0155885 A1* 6/2017 Selstad .............. H04N 13/0059

OTHER PUBLICATIONS

International Search Report and Written Opinion correlating to PCT/US2016/067517 dated Mar. 20, 2017, 18 pages.
Antonov, M., "Asynchronous Timewarp Examined", Developers Blog, <https://developer3.oculus.com/blog/asynchronous-timewarp-examined/>, Accessed Feb. 10, 2017, 11 pages.
Azuma, R., et al., "A Motion-Stabilized Outdoor Augmented Reality System", Proceedings of IEEE Virtual Reality, Mar. 13-17, 1999, 8 pages.
Binstock, A., "Optimizing VR Graphics with Late Latching", Developers Blog, <https://developer3.oculus.com/blog/optimizing-vr-graphics-with-late-latching/>, Accessed Jan. 7, 2016, 10 pages.
Vilcans, M., "Virtual Reality Tricks: Asynchronous Timewarp and Late Latching", Librador, <http://www.librador.com/2015/03/10/Asynchronous-timewarp-and-late-latching/>, Accessed Jan. 7, 2016, 3 pages.
Van Waveren, J.M.P., "The Asynchronous Time Warp for Virtual Reality on Consumor Hardware", VRST, Nov. 2-4, 2016, 10 pages.
"Optimizing VR Graphics with Late Latching", https://developer.oculus.com/blog/optimizing-vr-graphics-with-late-latching/, accessed Jan. 7, 2016, 10 pages.
"Virtual reality tricks: Asynchronous timewarp and late latchings", http://www.librador.com/2015/03/10/Asynchronous-timewarp-and-late-latching/, accessed Jan. 7, 2016, 3 pages.
A Motion-Stabilized Outdoor Augmented Reality System® Proceedings of IEEE Virtual Reality '99 (Houston, TX, Mar. 13-17, 1999), pp. 252-259.

* cited by examiner

ELECTRONIC DISPLAY STABILIZATION AT A GRAPHICS PROCESSING UNIT

BACKGROUND

Field of the Disclosure

The present disclosure relates generally to head mounted display systems and more particularly to electronic display stabilization in head mounted display systems.

Description of the Related Art

Virtual reality (VR) systems and augmented reality (AR) systems create an artificial, or partially artificial, environment using computer-generated three-dimensional (3D) imagery. A primary goal of VR and AR systems is to give a user a sense of "presence" in the created environment. This sense of presence is facilitated through the use of a display device that is integrated with the movements of the user. For example, some VR and AR systems employ a head mounted display (HMD) that provides separate left-eye and right-eye displays. The displays together present a stereoscopic, or 3D, representation of a scene in the represented world, where the presented scene reflects the user's relative perspective of the scene based on the user's current pose (that is, the location and orientation of the user's head relative to a reference coordinate frame for the depicted scene).

HMD-based VR and AR systems display 3D imagery as a sequence of display frames, each display frame rendered based on a corresponding detected head pose and persisting for a particular period of time. However, because of delays in processing the display frames, the user's head may have significantly rotated or otherwise changed position in the time between the initiation of the rendering of a frame and the display of the resulting rendered frame. As such, the imagery displayed at the HMD at a particular point in time may lag behind the user's head movements. This dissonance between the user's perceived orientation within a scene and the orientation of the perspective of the scene presented on the HMD can lead to user disorientation, or what is often referred to as "virtual reality sickness". To reduce or eliminate user discomfort and thereby provide improved presence, HMD-based VR and AR systems seek to minimize the motion-to-photon latency; that is, the latency between a user head/eye movement and when photons representing a scene from the resulting new pose hit the user's eye.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-5 illustrate techniques for performing electronic display stabilization (EDS) at a head mounted display (HMD) system with a low level of involvement by a central processing unit (CPU) in the EDS process. An application executed at the CPU generates sets of frame drawing commands for a graphics processing unit (GPU) of the HMD system, and for each set of frame drawing commands the GPU renders a corresponding frame into one of a plurality of frame buffers. Each frame is generated to include or be associated with a frame number, indicating the location of the frame in the sequence of frames generated over time. In addition, each frame is generated to include or be associated with pose information indicating the pose of the HMD system when the frame is generated. At periodic EDS preemption points, the GPU selects the frame stored at the plurality of frame buffers having the most recent frame number, identifies a current pose of the HMD system, and applies a modification, referred to herein as an EDS warp, to the frame based on the difference between the current pose and the pose information stored with the selected frame. Because the frame number and pose information are stored with the frame itself, the EDS preemption points can be asynchronous with the generation of frame command sets at the GPU. This reduces overhead at the CPU and GPU, and allows the EDS preemption points to be placed close to the time that a frame is scanned out to a display, improving the efficacy of the EDS process.

Figure 1:
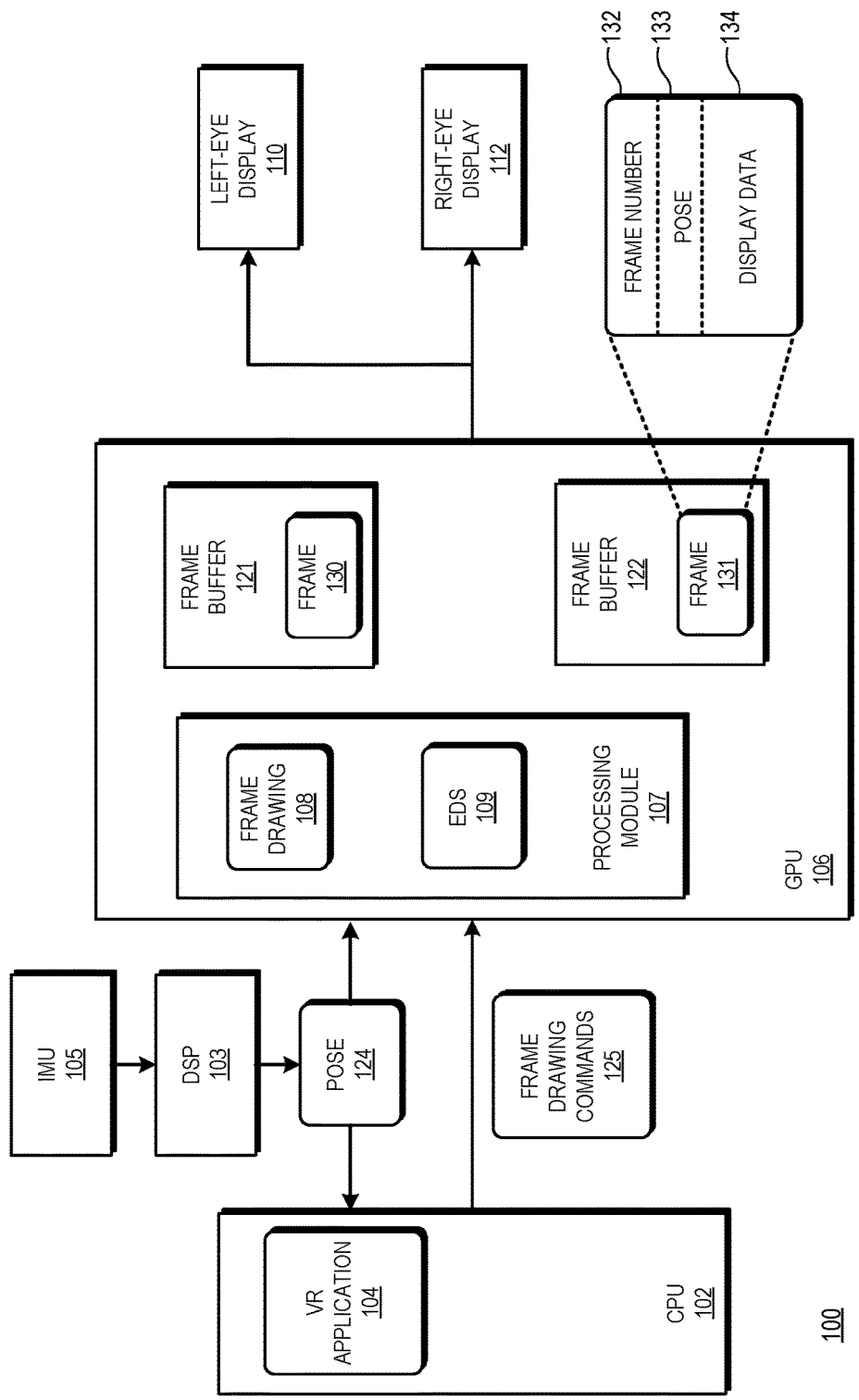
FIG. 1 is a block diagram of a head mounted display (HMD) system in accordance with at least one embodiment of the present disclosure.

FIG. 1 illustrates an HMD system 100 for providing VR or AR presence in the real world or an imagined world in accordance with at least one embodiment of the present disclosure. For purposes of description, it is assumed that the HMD system includes or is incorporated in an HMD device that is coupled to the movements of a user's head. For example, the HMD device may have a goggles or eyeglass form factor, wherein the device is mounted to the user's head and positioned in proximity to the user's eyes in a relatively fixed position. However, in some circumstances a user may hold a tablet computer or other hand-held device up to the user's face and constrain the movement of the hand-held device such that the orientation of the hand-held device to the user's head is relatively fixed even as the user's head moves. In such instances, a hand-held device operated in this manner also may be considered an implementation of the HMD device even though it is not "mounted" via a physical attachment to the user's head.

In the illustrated example of FIG. 1, the HMD system 100 includes a CPU 102, a digital signal processor (DSP) 103, an inertial measurement unit (IMU) 105, a GPU 106, and display panels 110 and 112. The CPU 102 is a processing unit generally configured to execute sets of instructions organized as computer programs, including VR or AR applications such as VR application 104. As described further herein, the VR application 104 is a program generally configured to provide a virtual reality experience for the user of the HMD system 100 by identifying, over time, poses of the HMD system 100 and based on those poses generating frames for display to the user. The user is thus given the impression that their movements in the real world are movements in a virtual reality generated by the VR application 104.

To support pose identification, the HMD system 100 includes the IMU 105 and the DSP 103. The IMU 105 includes one or more accelerometers, gyroscopes, magnetometers, or other sensors that generate electrical signals indicative of movement of the HMD system 100. The DSP 103 is a processing unit configured to sample, filter, and process the electrical signals produced by the IMU 105 to generate information, designated pose 124 at FIG. 1, indicative of the pose of the HMD system 100. The pose 124 can be expressed in any of a variety of formats, such as via a set of coordinates in a frame of reference for the HMD system 100. In at least one embodiment, the DSP 103 periodically updates the pose 124 so that the pose 124 always represents a relatively recent pose of the HMD system 100. Further, the DSP 103 can update the pose 124 asynchronously with the operations of the CPU 102 (including the operations of the VR application 104) and the GPU 106. The pose 124 can be stored in a shared memory (not shown) so that it can be accessed by the CPU 102 and the GPU 106 as needed, without synchronization with the DSP 103, thereby reducing overhead at the HMD system 100.

Based on the pose 124 and other input information, such as stored virtual reality environment files, user input information, and the like (not shown) the VR application 104 periodically generates sets of commands, such as frame drawing commands 125, wherein each command set is to generate a corresponding frame for display at the display panels 110 and 112. The frames generated over time compose a sequence of frames, and each set of commands indicates the number of the corresponding frame in the sequence. Thus, for example, the VR application 104 can generate frame drawing commands for a sequence of five frames, with the first frame in the sequence having frame number zero, the second frame in the sequence having frame number 1, and so on. In addition to including the frame number for each set of frame drawing commands, the VR application 104 includes the pose 124 used to generate the set of drawing commands in the command set.

To illustrate via an example, at a given time T the VR application 104 identifies that another frame is to be generated. In response the VR application 104 reads the pose 124 to identify the most recent captured pose information for the HMD system 100. Based on the pose 124 and other input information such as VR environment files (not shown) the VR application 104 generates frame drawing commands 125 to draw the corresponding frame. The VR application 104 generates the frame drawing commands to include, in at least one of the commands, the frame number for the frame to be generated and the pose 124. As described further below, this information can be used by the GPU 106 to apply an EDS warp to the frame asynchronously with the generation of the frame drawing commands 125, thereby reducing the overhead of synchronization between the operations of the GPU 106 and the CPU 102. In at least one embodiment, the EDS daemon 109 generates and applies the EDS warp using the techniques described in U.S. Patent Application Ser. No. 62/174,602, entitled "Electronic Display Stabilization for Head Mounted Display" and filed on Jun. 12, 2015, the entirety of which is incorporated by reference herein.

For example, in one embodiment the warping process employed by the EDS daemon 109 includes the determination, based on the head rotation indicated by the different in the pose information, of a homography rotation from the original head pose as indicated by the pose information stored at the frame and the updated head pose as determined by the EDS daemon 109, and the application of this homography rotation (in the form of a linear transform) to the frame to generate the warped, or modified, frame. Further, eyepiece lenses of the HMD system 100 (not shown) can introduce optical distortion, as well as chromatic aberrations, or color separation, due to different wavelengths of light separating when refracted through the eyepiece lenses, and thus the warping process employed by the EDS daemon 109 may compensate for one or more of optical distortion, chromatic aberrations, darkening toward the edges of the lenses, composite textures from other sources, and the like. The interim warping provided by the homography rotation may be implemented by applying the homography rotation to look-up table (LUT) values utilized by the distortion/chromatic aberration correction processes to introduce compensatory distortion (or "predistortion"), and then applying the resulting modified LUT values to the frame so as to concurrently implement both the homography rotation and the other correction/compensation processes.

The GPU 106 includes a processing module 107 and frame buffers 121 and 122. The processing module includes one or more instruction pipelines, compute units, or other processing circuitry to execute sets of commands. In the illustrated example of FIG. 1, the GPU 106 executes two different processes, referred to herein as daemons. In particular, the GPU 106 executes a frame drawing daemon 108 and an EDS daemon 109. The frame drawing daemon 108 is configured to receive the sets of frame drawing commands from the CPU 102 and based on each set render a corresponding frame into one of the frame buffers 121 and 122.

In at least one embodiment, the frame drawing daemon 108 alternates between the two frame buffers 121 and 122 as it generates the frames. Thus, the frame drawing daemon 108 employs the frame buffers 121 and 122 as a double frame buffer, rendering into one frame buffer while the other frame buffer is being scanned to one or both of the display panels 110 and 112. To illustrate via an example, the frame drawing daemon 108 can render the first frame in a sequence, designated frame 130, into the frame buffer 121. Based on the next set of frame drawing commands, the frame drawing daemon 108 renders the next frame in the sequence, designated frame 131, into the frame buffer 122. While the frame 131 is being rendered into frame buffer 122, frame 130 can be scanned out for display at one or both of the display panels 110 and 112. After the frame 130 has been scanned out, the frame drawing daemon 108 can render the next frame in the sequence (not shown) into the frame buffer 121 while frame 131, at frame buffer 122, is scanned out for display.

It will be appreciated that although in the illustrated embodiment of FIG. 1 the HMD system 100 employs a pair of frame buffers, in other embodiments the HMD system 100 can include three or more frame buffers while still employing the techniques described herein. Further, in some embodiments the HMD system 100 can employ multiple independent frame buffers for each of the display panels 110 and 112, or can employ frame buffers separated into sections to support foveated imaging while employing the techniques described herein.

The frame drawing daemon 108 renders each frame to include or be associated with at the least three types of information as indicated by the example of frame 131: a frame number (e.g., frame number 132) indicating the order of the frame in the sequence of frames generated by the VR application 104, pose information (e.g., pose 133) indicating the pose information used to generate the drawing commands upon which the frame was based, and display data (e.g., display data 134), representing pixel values for the frame to be displayed. The frame number may be a sequential number, a timestamp, or other identifier that indicates the frame's order in the sequence of frames. In at least one embodiment, the frame drawing daemon 108 generates each frame so that the frame number and pose information are stored at a "non-visible" portion of the frame—that is, stored at memory locations of the frame buffer that are not scanned out by the display panels 110 and 112, and therefore not visible to the user of the HMD system 100. In other embodiments, one or more of the frame number and pose information can be stored in a visible but relatively inconspicuous portion of the frame, such as near an edge of the frame. In yet other embodiments, one or both of the frame number and pose information may instead be stored outside the frame, but associated with the frame in a suitable manner (e.g., via a table, linked list, etc.).

The display panels 110 and 112 are configured to periodically select, in alternating fashion, one of the frame buffers 121 and 122 and scan out the visible portion of the frame stored at the selected buffer, thereby displaying the frame at the display panel. In at least one embodiment, the display panels 110 and 112 each correspond to a display for a different eye of the user—e.g. the display panel 110 is a left-eye display panel and the display panel 112 is a right-eye display panel. In at least one embodiment, the HMD system 100 can include different and multiple dedicated frame buffers for each of the display panels 110 and 112.

The EDS daemon 109 is configured to periodically apply an EDS warp to a selected frame stored at one of the frame buffers 121 and 122. The time at which the EDS daemon initiates generation and application of the EDS warp is referred to herein as an EDS preemption point. In at least one embodiment, the EDS preemption points are governed according to a fixed schedule, as indicated by a clock signal, but the fixed schedule is asynchronous with the generation of drawing commands by the CPU 102 and the rendering of frames by the frame drawing daemon 108, as described further herein.

In response to identifying an EDS preemption point, the EDS daemon 109 selects one of the frames stored at the frame buffers 121 and 122 based on the frames' corresponding display number. In at least one embodiment, the EDS daemon 109 selects the frame having the highest frame number (that is, the most recent frame in the frame sequence) that has been completely rendered into the corresponding frame buffer. The EDS daemon 109 reads the pose information stored at the selected frame, and also reads the pose 124 to determine the most recently identified pose of the HMD system 100. The difference between the frame pose information and the pose 124 indicates the difference between the pose of the HMD system 100 when the frame drawing commands for the frame were generated and the most recently identified pose of the HMD system 100. Based on this difference, the EDS daemon 109 identifies an EDS warp. The warp represents an adjustment of display data for the selected frame so that the frame more closely reflects the current pose of the HMD system 100, and can therefore represent translation of pixel locations, adjustments in pixel intensities or color, and the like. The EDS daemon 109 applies the EDS warp to the selected frame, thereby reducing jitter or other dissonant effects that can result from user motion.

As indicated above, the EDS preemption points for the EDS daemon 109 can be asynchronous with the generation of frame drawing commands by the CPU 102. This reduces the overhead in synchronizing operations of the CPU 102 and GPU 106, improving processing speed and efficiency, and further allows for the EDS warp to be applied more closely in time to the point when a frame is scanned out for display, thereby improving the effectiveness of the EDS process. To illustrate, in conventional systems an EDS warp is generated and applied by the GPU to a stored frame in response to signals from the CPU that a set of frame drawing commands has been completed. However, because of the varying visual complexity in the frames to be generated (reflecting variations in the complexity of the virtual environment as the user changes poses), the timing of the completion of sets of frame drawing commands will vary substantially. This in turn can cause variations in the relative amount of difference in the pose information used to generate the EDS warps, and in turn cause undesirable variations in the EDS process. By placing the frame number and pose information in each frame so that it can be read asynchronously by the EDS daemon 109, the HMD system 100 reduces these variations and thereby improves the effectiveness of the EDS process.

Figure 2:
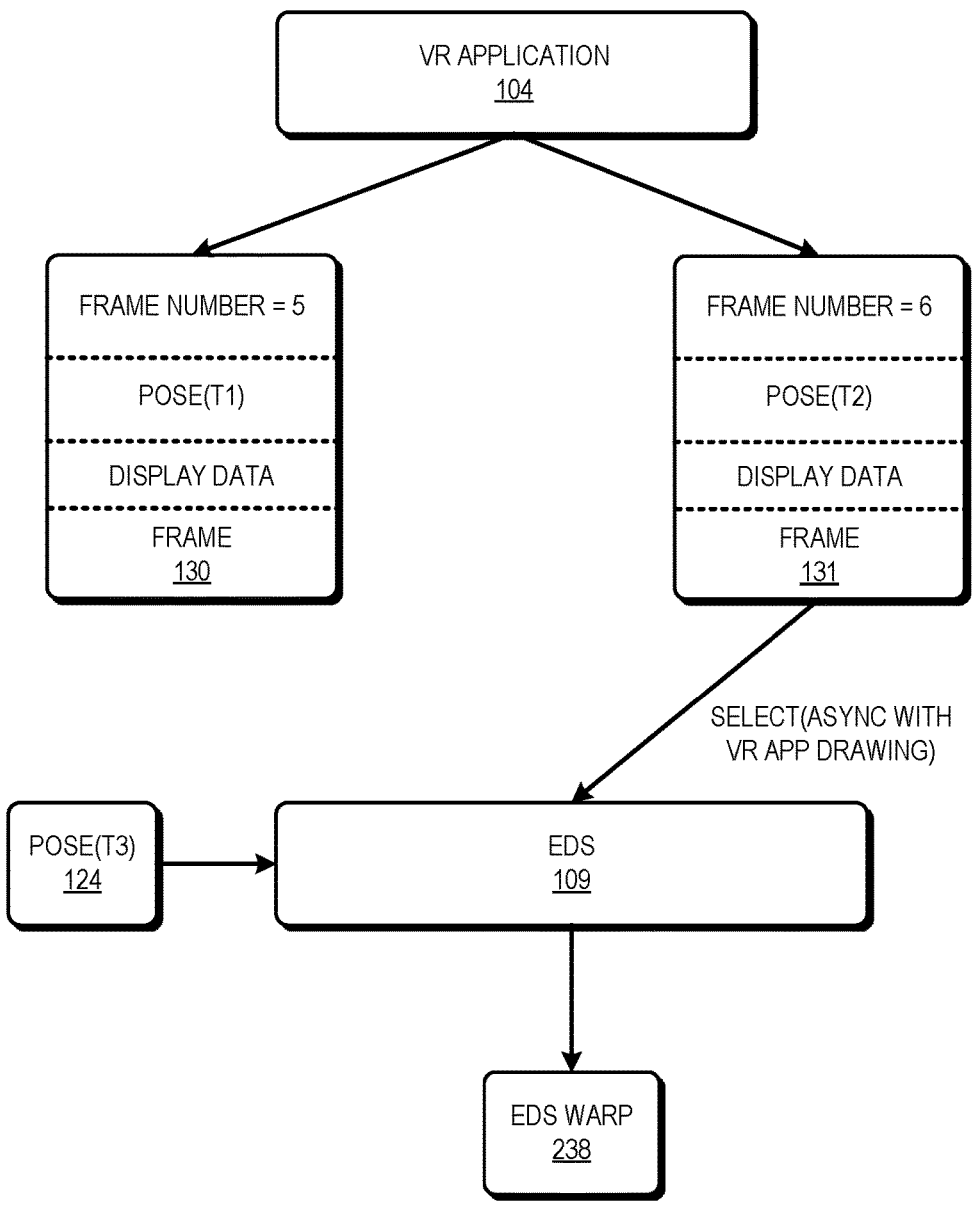
FIG. 2 is a block diagram illustrating the selection of a frame for electronic display stabilization (EDS) by a graphics processing unit (GPU) of the HMD system of FIG. 1 in accordance with at least one embodiment of the present disclosure.

FIG. 2 illustrates an example operation of the HMD system 100 in accordance with at least one embodiment. In the illustrated example, the VR application 104 generates (at different times) frame drawing command sets to generate two different frames—frame 130 and frame 131. Each frame is generated to include a frame number, pose information, and drawing data. Thus, frame 130 includes a frame number of five and pose information identified at a time designated T1. Frame 131 includes a frame number of six (indicating it was generated after frame 130) and pose information identified at a time designated T2 (after time T1).

In response to identifying an EDS preemption point, the EDS daemon 109 reviews the frames 130 and 131 stored at the frame buffers 121 and 122, and first identifies that both have been fully rendered into their respective frame buffer. The EDS daemon 109 therefore identifies both of the frames 130 and 131 as eligible for selection for EDS. The EDS daemon 109 then identifies that frame 131 has the highest frame number, and is therefore the most recent frame. In response, the EDS daemon 109 selects frame 131 for application of an EDS warp.

In some embodiments, the EDS daemon 109 may select a frame other than the frame having the highest frame number. For example, in at least one embodiment the EDS daemon 109 can select the frame based on a set pattern, such as selecting every second frame or every fourth frame, even if a later frame is fully rendered at one of the frame buffers. This can be useful to prevent the EDS process from adversely impacting the display of animations via the sequence of frames.

In response to, or concurrent with, selecting the frame 131, the EDS daemon 109 reads the pose 124. The pose information is updated since the frame drawing commands for the frames 130 and 131 were generated, such that the pose 124 reflects pose information identified at a time designated T3, after time T2 and time T1. Based on the difference between the pose at time T3 and the pose at time T2, as recorded at the frame 131, the EDS daemon 109 generates an EDS warp 238, representing an adjustment to the display data of the frame 131 so that the data reflects the pose at time T3. The EDS daemon applies the EDS warp to the frame 131, thereby stabilizing the data to be displayed and reducing the likelihood of virtual reality sickness or other impacts on the user experience.

Figure 3:
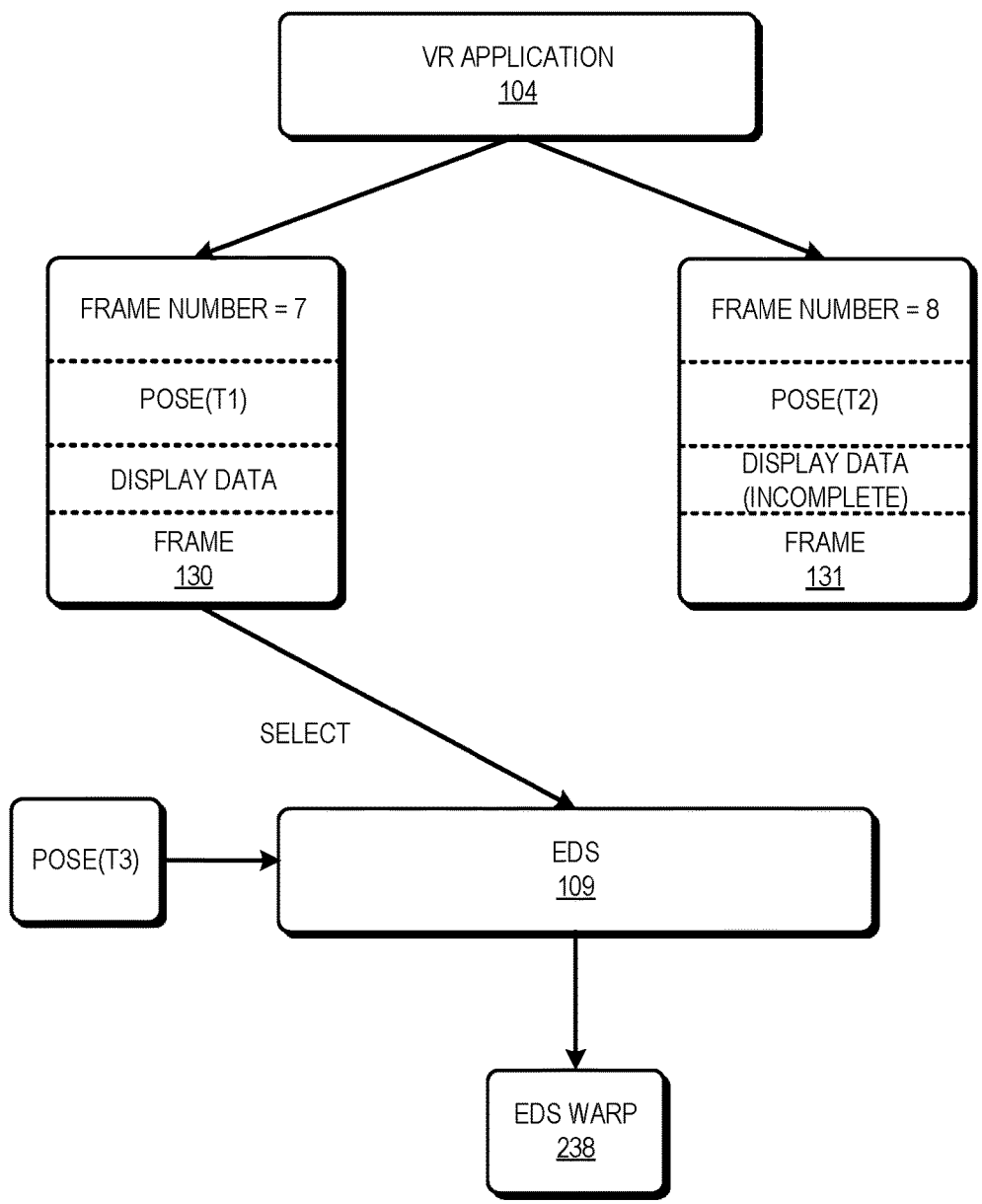
FIG. 3 is a block diagram illustrating the selection of frame for EDS at the HMD system of FIG. 1 based on completion of the frame rendering at the GPU in accordance with at least one embodiment of the present disclosure.

As indicated above, to prevent the EDS process from introducing errors in the displayed data, the EDS daemon 109 only selects frames that have been completely rendered at one of the frame buffers 120 and 121. An example is illustrated at FIG. 3 in accordance with at least one embodiment of the present disclosure. In particular, in the example of FIG. 3 the frame 131 has a higher frame number (eight) than the frame number (seven) of frame 130. However, the display data of frame 131 is incomplete—that is, all of the display data for the frame 131 has not been completely rendered into the frame buffer by the frame drawing daemon 108. Application of an EDS warp to the frame 131 when it has not been completely rendered could cause introduction of undesirable visual artifacts when the frame is scanned out for display. Accordingly, the EDS daemon selects frame 130 to generate and apply the EDS warp 238.

Figure 4:
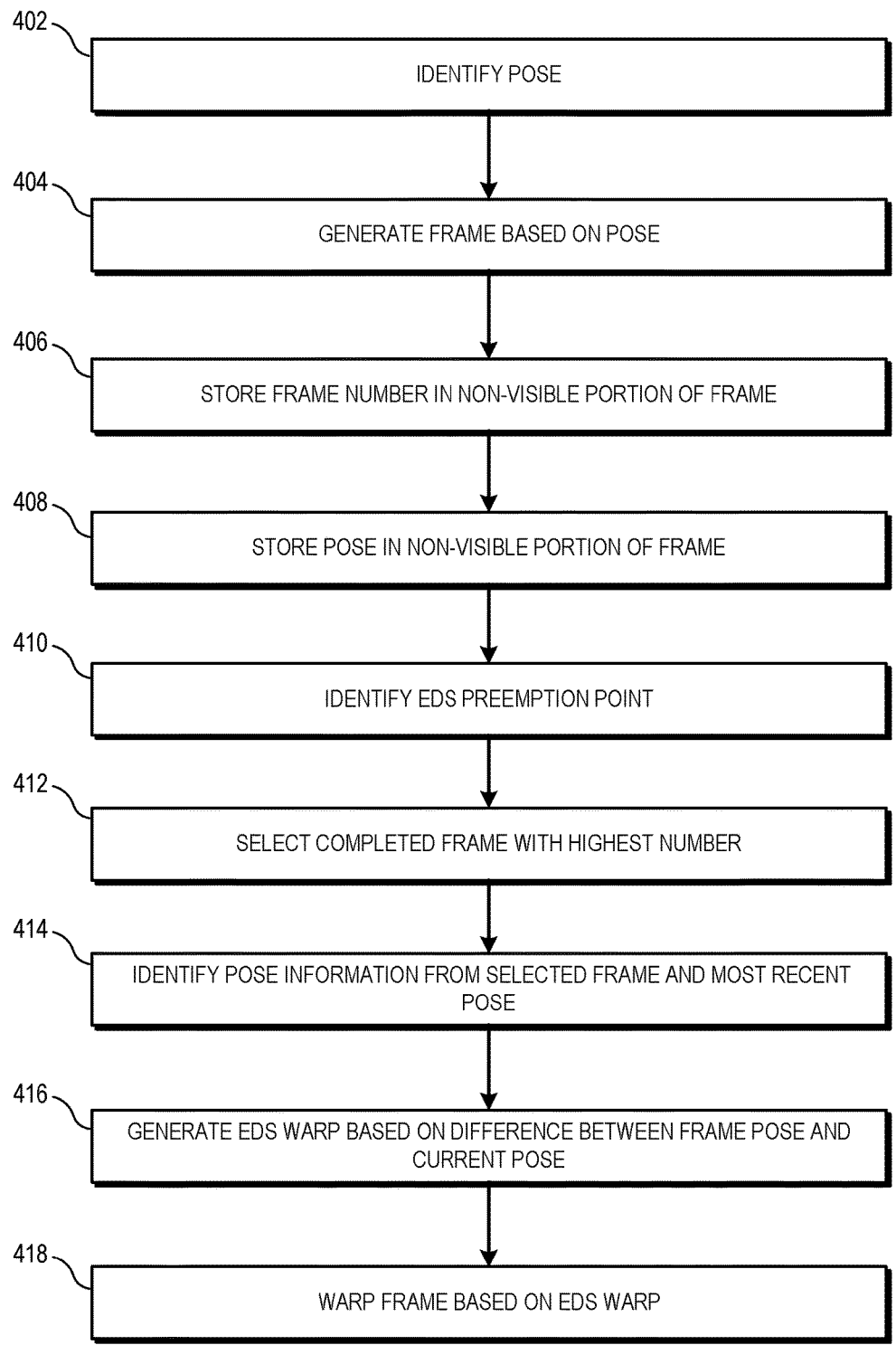
FIG. 4 is a flow diagram of a method of performing EDS at a GPU of an HMD system by selecting a frame from a sequence of frames stored at the GPU in accordance with at least one embodiment of the present disclosure.

FIG. 4 illustrates a flow diagram of a method 400 of performing EDS at a GPU of an HMD system by selecting a frame from a sequence of frames stored at the GPU in accordance with at least one embodiment of the present disclosure. For purposes of description, the method 400 is described with respect to an example implementation at the HMD system 100 of FIG. 1. At block 402, the CPU 102 reads the pose 124 to identify a recent pose of the HMD system 100. At block 404, based on the pose read at block 402 and other input information, the VR application 104 generates the frame drawing commands 125 to draw a frame. The GPU 106 receives the frame drawing commands 125 and based on the commands the frame drawing daemon 108 generates the corresponding frame. At block 406 the frame drawing daemon 108 stores the frame number of the frame, as indicated by the frame drawing commands 125, at the frame. In addition, at block 408 the frame drawing daemon 108 stores the pose identified at block 402, and as indicated by the frame drawing commands 125, at the frame. The frame drawing daemon 108 renders the frame, including the frame number and the pose, to one of the frame buffers 120 and 121.

At block 410, the EDS daemon 109 identifies an EDS preemption point. In at least one embodiment, the timing of the EDS preemption point is asynchronous with the generation of the frame drawing commands 125, and the corresponding rendering of the frame by the frame drawing daemon 108. At block 412, in response to identifying the EDS preemption point the EDS daemon 109 reviews the frames stored at the frame buffers 120 and 121 and selects the completed frame (that is, the frame that has been completely rendered into the frame buffer) that has the highest frame number as indicated by the frames. At block 414, the EDS daemon 109 reads the pose information stored at the selected frame and also reads the pose 124 to identify the most recently identified pose for the HMD system 100. At block 416, based on the difference between the two poses identified at block 414, the EDS daemon 109 generates an EDS warp according to one or more known EDS warp techniques. At block 418 the EDS daemon 109 applies the generated EDS warp to the selected frame, thereby stabilizing the display of frames at the HMD system 100.

In some embodiments, the HMD system 100 of FIG. 1 employs dedicated display buffers for each of the display panels 110 and 112, and alternates between performing EDS on the frames for each display panel. However, this can require careful scheduling of the EDS preemption point for each display panel to avoid an EDS preemption point occurring too long after the rendering of the last frame for each display panel, thereby causing jitter or other undesirable display errors. This issue can be exacerbated by the variability in rendering times resulting from the commensurate variability in the generation of drawing command sets at the CPU 102. Accordingly, in at least one embodiment, the GPU 106 places the EDS preemption points for the display panels such that the EDS preemption point for a display panel occurs at a point in time that is remote from the rendering period for that display panel. An example is illustrated at FIG. 5 in accordance with at least one embodiment of the present disclosure.

Figure 5:
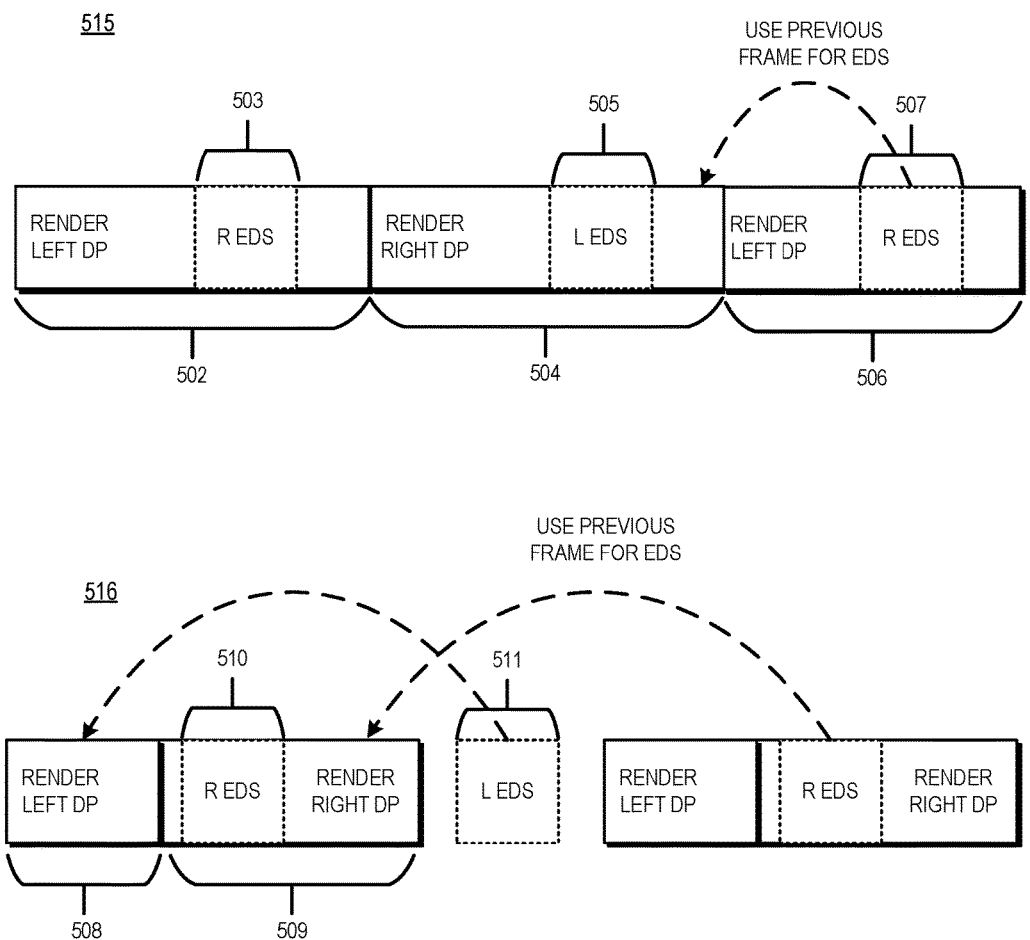
FIG. 5 is a block diagram illustrating the location of EDS preemption points used by the HMD system of FIG. 1 in accordance with at least one embodiment of the present disclosure.

FIG. 5 illustrates two instances of EDS preemption at the GPU 106, designated instance 515 and instance 516. For instance 515, the GPU renders a frame to the frame buffer for the left-eye display panel (display panel 110) during period 502. Further, the GPU 106 places an EDS preemption point for the right-eye display panel (display panel 112) during a period 503 that overlaps with period 502. Similarly, during period 504 (immediately following period 502) the GPU 106 renders a frame to the frame buffer for the right-eye display panel 112 and places a preemption point for the left eye-display panel 110 during a period 505 that overlaps with period 504. Period 504 is followed by period 506, during which the GPU 106 renders a frame to the frame buffer for the left-eye display panel 110. In addition, the GPU 106 places a preemption point for the right-eye display panel 112 during a period 507 that overlaps with the period 506. During each of the EDS preemption points, the GPU 106 uses the most recent completely rendered frame for that display panel to perform EDS as described above with respect to FIG. 1. Thus, for example, during right-eye EDS preemption period 507, the GPU 106 performs EDS using the right-eye frame rendered during period 504.

By scheduling EDS preemption points of a display panel so that they are somewhat remote from the corresponding frame rendering period for that panel, the GPU 106 can account for variations in the frame rendering periods resulting from variations in the timing and complexity of the sets of frame drawing commands generated by the CPU 102. An example is illustrated by instance 516, wherein a frame rendering period 508 for the left-eye display panel 110 completes relatively early as compared to frame rendering period 502 of FIG. 1. This in turn causes the ensuing frame rendering period 509 for right-eye display panel 112 to begin early, such that the right-eye EDS preemption period 510 overlaps with frame rendering period 509 rather than frame rendering period 508. Further, EDS preemption point 511 for left-eye display panel 110 occurs after frame rendering period 509, and does not overlap with a frame rendering period. However, because the EDS preemption points use the previously rendered completed frame, the EDS preemption points occur close enough in time to the rendering times such that the likelihood of jitter is substantially reduced.

In at least one embodiment, the GPU 106 can identify when EDS preemption points are becoming too remote in time from the frames used for EDS. In response the GPU 106 can, either in conjunction with the CPU 102 or independently, slow the frame rate—that is, the rate at which it renders and displays frames. This can reduce the likelihood that the EDS will be too remote in time from the display time of each frame, thereby improving the effectiveness of the EDS process and commensurately improving the user experience.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A non-transitory computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method implemented at a head mounted display (HMD) system, the method comprising:
   generating a set of commands at a central processing unit (CPU) of the HMD system for generating a first frame;
   generating by a first daemon, based on a first pose of the HMD system and the set of commands from the CPU, the first frame of a plurality of frames for display;
   asynchronously selecting at a graphics processing unit (GPU) of the HMD system the first frame based on a first frame number indicating a position of the first frame in a sequence of the plurality of frames; and
   applying by a second daemon at the GPU a first electronic display stabilization (EDS) warp to the selected first frame based on the first pose and a second pose of the HMD system, the second pose occurring after the first pose.

2. The method of claim 1, wherein selecting the first frame comprises:
   identifying the first frame number based on frame number information stored at the first frame.

3. The method of claim 1, wherein selecting the first frame comprises:
   selecting the first frame further based on an indication that the first frame has been completely rendered into a frame buffer.

4. The method of claim 1, wherein applying the first EDS warp comprises:
   identifying the first pose based on information stored at the first frame.

5. The method of claim 1, further comprising:
   generating, based on a third pose of the HMD system, a second frame of the plurality of frames;
   selecting at the GPU the second frame based on a second frame number indicating a position of the second frame in the sequence of the plurality of frames; and
   applying at the GPU a second EDS warp to the selected second frame based on the third pose and a fourth pose of the HMD system, the fourth pose occurring after the third pose.

6. The method of claim 5, wherein the first frame comprises a frame for display at a left-eye display panel of the HMD system and the second frame comprises a frame for display at a right-eye display panel of the HMD system.

7. A method, comprising:
   at graphics processing unit (GPU) of a head mounted display (HMD) system, rendering a plurality of frames for display based on commands asynchronously generated by and received from a central processing unit (CPU) of the HMD system; and
   asynchronously with rendering the plurality of frames by a first daemon, selecting a first frame of the plurality of frames for application of an electronic display stabilization (EDS) warp by a second daemon.

8. The method of claim 7, wherein selecting the first frame comprises selecting the first frame based on a frame number stored at the frame, the frame number indicating an order of the first frame in a sequence of frames.

9. The method of claim 8, wherein selecting the first frame further comprises selecting the frame based on an indication that the first frame has been completely rendered to a frame buffer of the HMD system.

10. The method of claim 7, further comprising:
    identifying a first pose of the HMD system associated with the first frame based on pose information stored at the first frame; and
    applying the EDS warp based on the first pose.

11. The method of claim 10, further comprising:
identifying at the GPU a second pose of the HMD system; and
wherein applying the EDS warp comprises applying the EDS warp based on a difference between the first pose and the second pose.

12. The method of claim 11, wherein the identifying the second pose comprises identifying the second pose after identifying the first pose.

13. A head mounted display (HMD) system, comprising:
a central processing unit (CPU) to generate, based on a first pose of the HMD system, a set of commands to generate a first frame of a plurality of frames for display; and
a graphics processing unit (GPU) to:
generate with a first daemon the frames into a frame buffer asynchronously from the CPU generating the set of commands;
select the first frame based on a first frame number indicating a position of the first frame in a sequence of the plurality of frames; and
apply with a second daemon, asynchronously from the CPU generating the set of commands, a first electronic display stabilization (EDS) warp to the selected first frame based on the first pose and a second pose of the HMD system, the second pose occurring after the first pose.

14. The HMD system of claim 13, wherein:
the GPU is to identify the first frame number based on frame number information stored at the first frame.

15. The HMD system of claim 13, wherein:
the GPU is to select the first frame based on the first frame number and based on an indication that the first frame has been completely rendered into the frame buffer.

16. The HMD system of claim 13, wherein:
the GPU is to identify the first pose based on information stored at the first frame.

17. The HMD system of claim 13, wherein the GPU is to:
generate, based on a third pose of the HMD system, a second frame of the plurality of frames;
select the second frame based on a second frame number indicating a position of the second frame in the sequence of the plurality of frames; and
apply a second EDS warp to the selected second frame based on the third pose and a fourth pose of the HMD system, the fourth pose occurring after the third pose.

18. The HMD system of claim 17, further comprising:
a left-eye display panel;
a right-eye display panel; and
wherein the first frame comprises a frame for display at a left-eye display panel of the HMD system and the second frame comprises a frame for display at a right-eye display panel of the HMD system.

* * * * *